(12) United States Patent
Zhu et al.

(10) Patent No.: US 11,164,229 B2
(45) Date of Patent: Nov. 2, 2021

(54) HYPERGRAPH STRUCTURE AND TRUNCATION METHOD THAT REDUCES COMPUTER PROCESSOR EXECUTION TIME IN PREDICTING PRODUCT RETURNS BASED ON LARGE SCALE DATA

(71) Applicant: International Business Machines Corporation, Armonk, NY (US)

(72) Inventors: Yada Zhu, Irvington, NY (US); Ajay Ashok Deshpande, White Plains, NY (US); Jae-Eun Park, Wappingers Falls, NY (US); Anna Wanda Topol, Clifton Park, NY (US); Xuan Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/194,970

(22) Filed: Nov. 19, 2018

(65) Prior Publication Data

US 2020/0160418 A1 May 21, 2020

(51) Int. Cl.
*G06Q 30/02* (2012.01)
*G06Q 30/06* (2012.01)

(52) U.S. Cl.
CPC ..... *G06Q 30/0617* (2013.01); *G06Q 30/0202* (2013.01); *G06Q 30/0222* (2013.01)

(58) Field of Classification Search
CPC ......... G06Q 10/06311; G06Q 30/0201; G06Q 50/01; G06Q 10/00; G06Q 10/06;
(Continued)

(56) References Cited

U.S. PATENT DOCUMENTS 9,852,433 B2  12/2017  Patel et al.
2016/0162913 A1*  6/2016  Linden ............... G06Q 30/0202
                                                                705/7.31
(Continued)

FOREIGN PATENT DOCUMENTS

GN  106682955 A  5/2017
GN  107274191 A  10/2017

OTHER PUBLICATIONS

Jianbo Li, Jingrui He, et al. "E-tail Product Return Prediction via Hypergraph-based Local Graph Cut", KDD '18: Proceedings of the 24th ACM SIGKDD International Conference on Knowledge Discovery & Data Mining Jul. 2018 pp. 519-527 (Year: 2018).*

(Continued)

*Primary Examiner* — Jamie H Austin
(74) *Attorney, Agent, or Firm* — Scully, Scott, Murphy & Presser, P.C.; Daniel P. Morris

(57) ABSTRACT

A hypergraph is constructed based on historical shopping cart data. A node of the hypergraph corresponds to a shopping basket, and a hyperedge of the hypergraph corresponds to a unique product, the hyperedge connecting all nodes of the hypergraph representing baskets containing the unique product. A hypergraph partition algorithm identifies a cluster of shopping baskets represented in the hypergraph and determined to be similar to a given basket. Based on the cluster of shopping baskets a dual-level return prediction is performed. The dual-level return prediction includes predicting whether the given basket will be returned, and based on predicting that the given basket will be returned, predicting a probability that a product in the given basket will be returned. Based on predicting that the given basket will be returned, an ameliorative action is performed to reduce the probability.

16 Claims, 6 Drawing Sheets

|    | V1 | V2 | V3 | V4 | V5 | V6 | V7 |
|----|----|----|----|----|----|----|----|
| e1 | 1  | 2  | 1  | 0  | 0  | 0  | 0  |
| e2 | 0  | 2  | 1  | 0  | 3  | 1  | 1  |
| e3 | 0  | 0  | 0  | 1  | 1  | 1  | 1  |

(58) Field of Classification Search
CPC ........ G06Q 10/10; G06Q 50/26; G06Q 10/04;
G06Q 10/063; G06Q 10/063114; G06Q
10/063118; G06Q 10/06316; G06Q
10/0633; G06Q 10/101; G06Q 10/103;
G06Q 10/1093; G06Q 10/1095; G06Q
10/30; G06Q 30/00; G06Q 30/01; G06Q
30/02; G06Q 30/0202; G06Q 30/0222;
G06Q 30/0276; G06Q 30/0277; G06Q
30/0617
See application file for complete search history.

(56) References Cited

U.S. PATENT DOCUMENTS

2016/0275590 A1\* 9/2016 Todasco ............... G06Q 30/016
2016/0321684 A1\* 11/2016 Chen .................. G06Q 30/0208

OTHER PUBLICATIONS

Li, J., et al., "E-tail Product Return Prediction via Hypergraph-based Local Graph Cut", KDD '18 Proceedings of the 24th ACM SIGKDD International Conference on Knowledge Discovery & Data Mining, Aug. 19-23, 2018, pp. 519-527, (Grace Period Disclosure).

Agarwal, S., et al., "Beyond Pairwise Clustering", Proceedings of the 2005 IEEE Computer Society Conference on Computer Vision and Pattern Recognition (CVPR'05), Jul. 2005, pp. 838-845, vol. 2.

Anderson, R., "Local Graph Partitioning using PageRank Vectors", Proceedings of 47th Annual IEEE Symposium on Foundations of Computer Science, Sep. 24, 2006, pp. 475-486.

Anderson, R., et al., "Local Partitioning for Directed Graphs Using PageRank", Proceedings of International Workshop on Algorithms and Models for the Web-Graph, Dec. 11-12, 2007, 17 pages.

Bellaachia, A., et al., "Random Walks in Hypergraph", Proceedings of the 2013 International Conference on Applied Mathematics and Computational Methods, Sep. 28-30, 2013, pp. 187-194.

Li, L., et al., "News Recommendation via Hypergraph Learning: Encapsulation of User Behavior and News Content", WSDM '13, Feb. 4-8, 2013, pp. 305-314.

Rodriguez, J.A., "On the Laplacian Spectrum and Walk-regular Hypergraphs", Linear and Multilinear Algebra, Sep. 2003, pp. 1-16.

Satchidanand, S.N., et al., "Extended Discriminative Random Walk: A Hypergraph Approach To Multi-View Multi-Relational Transductive Learning", Proceedings of the Twenty-Fourth International Joint Conference on Artificial Intelligence, Jul. 2015, 7 pages.

Spielman, D.A., et al., "A Local Clustering Algorithm for Massive Graphs and Its Application to Nearly Linear Time Graph Partitioning", SIAM Journal of Computation, Submitted Dec. 29, 2008, Accepted Jul. 22, 2012, Published online Jan. 10, 2013, pp. 1-26, vol. 42, No. 1.

Tan, H.-K., et al., "Modeling Video Hyperlinks with Hypergraph for Web Video Reranking", MM'08, Oct. 26-31, 2008, 4 pages.

Urbanke, P., et al., "Predicting Product Returns in E-Commerce: The Contribution of Mahalanobis Feature Extraction", Thirty Sixth International Conference on Information Systems, Dec. 2015, 19 pages.

Yang, H., et al., "Local Algorithm for User Action Prediction Towards Display Ads", KDD'17, Aug. 13-17, 2017, 9 pages.

Zhou, Y., et al., "Large-scale Parallel Collaborative Filtering for the Netflix Prize", AAIM '08 Proceedings of the 4th international conference on Algorithmic Aspects in Information and Management, Jun. 23-25, 2008, 12 pages.

Zhou, D., et al., "Learning with Hypergraphs: Clustering, Classification, and Embedding", Advances in Neural Information Processing Systems 19: Proceedings of the 2006 Conference, Sep. 2007, 8 pages.

Zhu, Y., et al., "A Local Algorithm for Product Return Prediction in E-Commerce", Proceedings of the Twenty-Seventh International Joint Conference on Artificial Intelligence (IJCAI-18), Jul. 13-19, 2018, pp. 3718-3724.

Zien, J.Y., et al., "Multilevel Spectral Hypergraph Partitioning with Arbitrary Vertex Sizes", IEEE Transactions on Computer-Aided Design of Integrated Circuits and Systems, Sep. 1999, pp. 1389-1399, vol. 18, No. 9.

\* cited by examiner

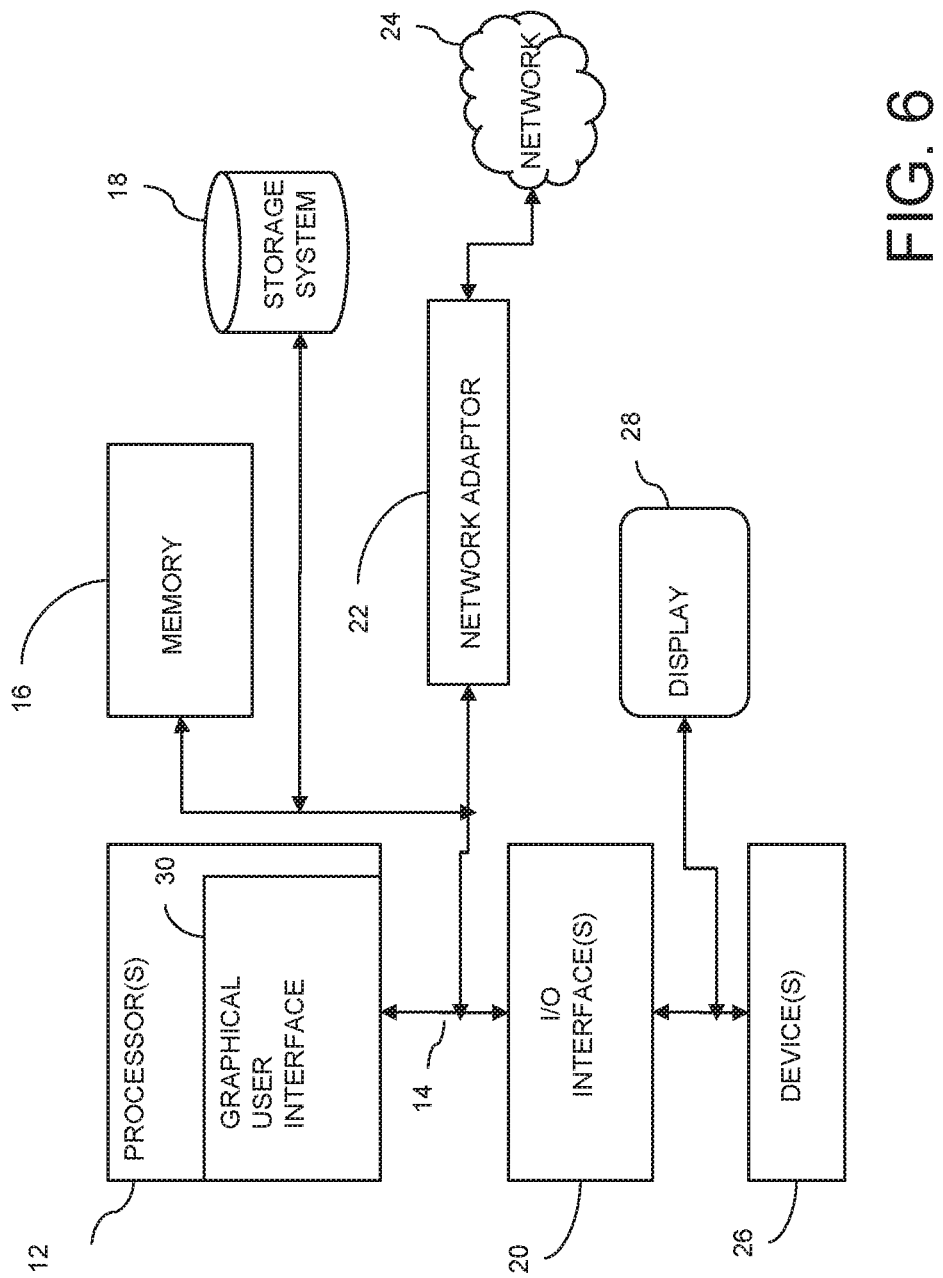

HYPERGRAPH STRUCTURE AND TRUNCATION METHOD THAT REDUCES COMPUTER PROCESSOR EXECUTION TIME IN PREDICTING PRODUCT RETURNS BASED ON LARGE SCALE DATA

STATEMENT REGARDING PRIOR DISCLOSURES BY THE INVENTOR OR A JOINT INVENTOR

The following disclosure is submitted under 35 U.S.C. 102(b)(1)(A): Jianbo Li, Jingrui He, Yada Zhu, "E-tail Product Return Prediction via Hypergraph-based Local Graph Cut", KDD '18 Proceedings of the 24th ACM SIGKDD International Conference on Knowledge Discovery & Data Mining, Pages 519-527, London, United Kingdom, Aug. 19-23, 2018.

BACKGROUND

The present application relates generally to computers and computer applications, and more particularly to a hypergraph based dual-level product return prediction, which can reduce processor or hardware execution time, and for example, support an online application.

Recent decades have witnessed the rapid growth of electronic or E-commerce. In particular, electronic or E-tail has provided customers with convenience by allowing the customers to purchase retail products from anywhere without visiting the actual traditional stores. A recent trend in E-tail is to allow free shipping and hassle-free returns to further attract online customers. However, a downside of such a customer-friendly policy is the rapidly increasing return rate as well as the associated costs of handling returned online orders. Therefore, it would be helpful to take proactive measures, which reduce the return rate and the associated cost, for instance, in an automated and efficient manner. In another aspect, performing such predictions may utilize large scale data, which may slow down the execution pace of a computer. A method that can allow a computer system to efficiently perform such predictions, for example, may be helpful.

BRIEF SUMMARY

A computer-implemented method, in one aspect, may include constructing a hypergraph based on historical shopping cart data. A node of the hypergraph corresponds to a shopping basket, and a hyperedge of the hypergraph corresponds to a unique product. The hyperedge connects all nodes of the hypergraph representing baskets containing the unique product. The method may also include executing a hypergraph partition algorithm. The hypergraph partition algorithm identifies a cluster of shopping baskets represented in the hypergraph and determined to be similar to a given basket. The method may also include, based on the cluster of shopping baskets identified by the hypergraph partition algorithm, performing a dual-level return prediction. The dual-level return prediction includes predicting whether the given basket will be returned, and based on predicting that the given basket will be returned, predicting a probability that a product in the given basket will be returned. The method may also include, based on predicting that the given basket will be returned, performing an ameliorative action to reduce the probability.

A system, in one aspect, may include at least one hardware processor and a memory device coupled with the at least one hardware processor. The at least one hardware processor may be operable to construct a hypergraph based on historical shopping cart data, a node of the hypergraph corresponding to a shopping basket, and a hyperedge of the hypergraph corresponding to a unique product, the hyperedge connecting all nodes of the hypergraph representing baskets containing the unique product. The at least on hardware processor may be also operable to store the hypergraph on the memory device. The at least on hardware processor may be also operable to execute a hypergraph partition algorithm, the hypergraph partition algorithm identifying a cluster of shopping baskets represented in the hypergraph and determined to be similar to a given basket. The at least on hardware processor may be also operable to, based on the cluster of shopping baskets identified by the hypergraph partition algorithm, perform a dual-level return prediction. The dual-level return prediction includes predicting whether the given basket will be returned, and based on predicting that the given basket will be returned, predicting a probability that a product in the given basket will be returned. The at least on hardware processor may be also operable to, based on predicting that the given basket will be returned, perform an ameliorative action to reduce the probability.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 illustrates a schematic of an example computer or processing system that may implement a system according to one embodiment.

DETAILED DESCRIPTION

Figures 1A, 1B:
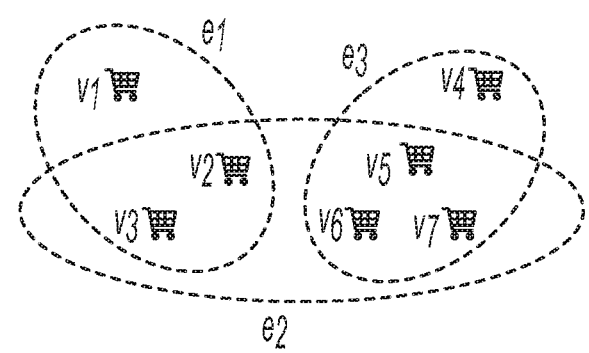
FIGS. 1A and 1B provide a simple example of a hypergraph in one embodiment.

The present disclosure discloses, in one aspect, a generic framework including a hypergraph representation and a local graph cut algorithm for E-tail product return prediction that aims to predict the customer's intention to return after the customer has put together the shopping basket in an electronic shopping cart. In one aspect, a dual-level return prediction is generated based on the output closure from the local graph cut algorithm. For the baskets with a high return intention, the E-tailers can then take appropriate measures to incentivize the customer not to issue a return and/or prepare for reverse logistics.

A system, method and techniques are presented, in embodiments, which implement a hypergraph representation of historical purchase and return records, effectively leveraging the information of basket composition, for instance, to predict before a purchase is made, whether or not an item in an electronic shopping, if purchased, will be returned. For a given basket, a method in one embodiment may implement a local graph cut algorithm using truncated random walk on the hypergraph to identify similar historical baskets. In one embodiment, the truncated random walk starts from a given basket, and explores the neighborhood of this seed node on the hypergraph. Based on the identified similar historical baskets, the method in one embodiment can estimate the return intention on two levels: basket-level vs. product-level, which provides the E-tailers with detailed information regarding the reason for a potential return. Examples of a reason may be that there are duplicate products with different shades and/or different sizes. In one embodiment, the prediction is made before the customers have made the purchase, potentially leading to a changed basket composition with a decreased return intention. A benefit of the local algorithm lies in its time complexity, which is linearly dependent on the size of the output cluster and polylogarithmically dependent on the volume of the hypergraph. Thus, the method saves computing time or cycles of a computer processor. For instance, such efficient time saving technique makes the method suitable for processing large-scale data sets such as the data sets processed in e-commerce computer systems. Benchmarking the methodology of the present disclosure in comparison with multiple real-world E-tail data demonstrated the effectiveness and efficiency of the methodology.

In one aspect, historical shopping cart information and associated return records are obtained. A hypergraph is built based on the content of historical shopping carts. In one embodiment, each node corresponds to a shopping basket, and each hyperedge corresponds to a unique product, connecting all the nodes associated with the baskets containing this product. In one aspect, the hypergraph-based representation may include representations of historical purchase and return records. For a given shopping cart, a similar group of shopping carts (referred to as a shopping cart cluster) are searched for and identified, via hypergraph partition. For instance, a local graph cut algorithm is disclosed, which can identify similar historical baskets for any given basket. Based on the shopping cart cluster (e.g., output cluster from the local graph cut algorithm), a return risk (possibility or probability that one or more products or items will be returned if purchased) of the given shopping cart is predicted, for instance, before the actual purchase is made. For the shopping cart having one or more items predicted to be returned, a product-level of return risk is predicted. The return risk prediction and the product-level of return risk prediction are referred to as a dual-level return risk prediction. Based on the dual-level return risk prediction, an incentive or action may be provided to proactively prevent a potential return. Examples of actions may include, but are not limited to, popping up a chatbot on a user's device to provide guidance regarding size and fit or another guidance, offering discount coupons on the products that contribute to the high predicted return intention, and/or preparing for reverse logistics.

Graphs can be used in data mining to capture the relationships between entities, where the entities are considered as nodes and the relationships as edges. Such graphs serve as the underlying data model in tasks such as ranking, clustering, and recommendation. Simple graph, however, can only capture pair-wise relationships between nodes preventing from modeling complex relationships. A hypergraph is a generalization of simple graphs that can accurately model high-order relations. In one aspect, truncated random walk based local graph cut algorithms for hypergraphs are implemented, which provide an effective and efficient solution for E-tail product return prediction.

In one aspect, a system and/or method facilitate taking a variety of counter measures with respect to potential returns, marketing and recommending products accounting for potential return. A generic framework in one aspect, may predict product returns, before customers have made the purchase, during their online shopping journey, based on a hypergraph representation, a local graph cut method, and a dual-level (shopping cart and products in the cart) probability model.

In one aspect, the methodology of the present disclosure can support a large scale online application. In one aspect, the time complexity of the local algorithm depends linearly on the size of the output cluster and polylogarithmically on the volume of the hypergraph, making the methodology suitable for large amount of data such as historical purchase and return records, for example, which may reach hundreds of thousands of products and millions of baskets.

The following notations are used in the present disclosure. Let $G=(V,E,w)$ denote the hypergraph that the system and/or method construct to represent historical purchase and return records, where V is the node set including n nodes, and E is the hyperedge set including m hyperedges. For any hyperedge $e \in E$, it can be considered as a subset of V, i.e., $e \subset V$, indicating that it connects 2 or more nodes together, and $w(e) \geq 0$ is a non-negative weight associated with this hyperedge. Let H denote the n×m incidence matrix of G. Its entries $H(v,e)>0$ and only if $v \in e$, and $H(v,e)=0$ otherwise. $H(v,e)$ can vary from product to product even within the same basket, reflecting the quantity of the product in this basket. Based on H, the system and/or method define the degree of a node $v \in V$ as $d(v)=\Sigma_{e \in E} w(e) H(v,e)$, the degree of a hyperedge $e \in E$ as $\delta(e)=\Sigma_v H(v,e)$, and the volume of a node subset $S \subset V$ as $\text{vol} S = \Sigma_{v \in S} d(v)$. In particular, the volume of the hypergraph $\text{vol } V$ is $\Sigma_{v \in V} d(v)$. In one aspect, the system and/or method of the present disclosure consider a cut on the graph as a partition that separates the node set V into set S and $\overline{S}$, where $\overline{S}$ is the compliment of S. The boundary of S is defined as the set of hyperedges that connect S and $\overline{S}$, i.e. $\partial S = \{e \in E | e \cap S \neq \emptyset, e \cap \overline{S} \neq \emptyset\}$. The volume of S is the sum of degrees of all the nodes in S, i.e., $\text{vol} S = \Sigma_{v \in S} d(v)$ and the volume of the boundary is $$\text{vol} \partial S = \sum_{e \in \partial S} w(e) \frac{|e \cap S||e \cap \overline{S}|}{\delta(e)}. \quad (1)$$

In the notations, boldface upper case letters are used to denote matrices, and boldface lower case letters are used to denote vectors.

Hypergraph-Based Representation

FIGS. 1A and 1B show an example of a hypergraph in one embodiment. The example graph illustrates 3 products $E=\{e_1,e_2,e_2\}$ and 7 shopping baskets $V=\{v_1,v_2,v_3,v_4,v_5,v_6,v_7\}$. In FIG. 1A, the numbers in the table reflect the quantity of each product in a basket. In FIG. 1B, the hypergraph is able to capture the complex relationship among products and shopping baskets.

Given the large number of historical purchase and return records, the system and/or method in one embodiment builds a hypergraph G, which may effectively leverage the information from these records. In the hypergraph, each node corresponds to a shopping basket, with or without returned products, and each hyperedge corresponds to a unique product connecting all the basket nodes containing this product. FIGS. 1A and 1B provide a simple example of a hypergraph in one embodiment. Compared with regular graphs where each edge always connects two nodes, the hypergraph constructed this way is able to capture the co-existence of multiple products within the same basket, i.e., multiple hyperedges incident with the same node, which can indicate a signal for potential product returns. For example, if a shopping basket contains multiple similar products such as white T-shirts, more often than not, the customer would like to try them out and only keep one that fits the best while returning the rest. On the other hand, regular graphs are limited to pairs of products and thus lose the relationships of items in the entire basket.

Based on the hypergraph of the present disclosure, given a basket, if it contains many shared or similar products with historical baskets with returns, then it is likely to be (e.g., at least partially) returned as well. Given the large number of historical baskets, a challenge becomes identifying similar historical baskets effectively (accurately) and efficiently. In one embodiment a local graph cut algorithm is disclosed which addresses this challenge.

Local Graph Cut on Hypergraphs

Let v∈V denote the given basket, for which the return intention is being predicted. In one aspect, the system and/or method may first define a random walk on the hypergraph via the following two steps: first choose a hyperedge e over all the hyperedges incident with v with probability proportional to w(e), and then choose a node u∈e with probability proportional to H(u,e) The transition probability from node v to node u can be written as follows.

$$P(v, u) = \sum_{e \in E} w(e) \frac{H(v, e)}{d(v)} \frac{H(u, e)}{\delta(e)}. \tag{2}$$

where P(v,u) is the element of the n×n transition matrix P in the $v^{th}$ row and the $u^{th}$ column. Based on this random walk, the system and/or method may further define the lazy random walk with transition matrix M define as follows.

$$M = (P+I)/2 \tag{3}$$

where I is an n×n identity matrix. For the lazy random walk defined this way, the system and/or method may obtain the stationary distribution as follows:

$$\pi(v) = \frac{d(v)}{vol V}. \tag{4}$$

Based on this random walk, the system and/or method may seek to find a local cluster S near the given basket node v that minimizes the cut conductance on the hypergraph defined below:

$$\Phi_c(S) = \frac{vol \partial S}{\min\{vol S, vol \bar{S}\}} \tag{5}$$

where the numerator is the volume of the boundary with respect to S, and the denominator is the volume of the smaller side of the partition induced by S.

Let p(u) (u∈V) denote the probability distribution of a random walk starting from node v. The system and/or method may define $$I(p, x) = \max_{\substack{\omega \in [0,1]^n \\ \omega(u) \frac{\pi(u)}{\Sigma \pi} = x}} \sum_{u \in V} \omega(u) p(u). \tag{6}$$

It can be checked that I(p,0)=0 and I(p,1)=1. As the distribution p approaches the stationary distribution, the curve I(p,·) approaches the straight line. Let $S_j(p)$ denote the set of j nodes maximizing p(u)/π(u), and let $\lambda_j(q_t)$ denote its volume, i.e., $\lambda_j(p)$=vol$S_j(p)$. Furthermore, denote $I_x(p,x)$ as the partial derivate of I(p,x) with respect to x, there is $$I_x(p, x) = \lim_{\delta \to 0} I_x(p, x - \delta) = \frac{p(\sigma(j))}{\pi(\sigma(j))}, \tag{7}$$

where $\sigma(j)=S_j(p)-S_{j-1}(p)$ is the permutation function, such that $$\frac{p(\sigma(j))}{\pi(\sigma(j))} \geq \frac{p(\sigma(j+1))}{\pi(\sigma(j+1))}. \tag{8}$$

for all j. As p(σ(j))/π(σ(j)) is non-increasing. $I_x(p,x)$ is a non-increasing function in x and I(p,x) is a concave function in x. I(p,x) is used as one convergence measure and $I_x(p,x)$ characterizes the normalized probability mass.

In one aspect, let p denote the n×1 vector whose elements are set to p(u). First, let $[p]_\varepsilon$ be the truncation operator applied on p, such that its $u^{th}$ element $[p]_\varepsilon(u)=p(u)$ if and only if p(u)≥π(u)ε, where π(u) is the stationary distribution at node u, and 0 otherwise. Second, define $$t_{last}=(l+1)t_1$$

$$\varepsilon=1/(c_3(l+2)t_{last}2^b) \tag{9}$$

where $$t_1 = \left\lceil \frac{2}{\phi^2} \ln\left(c_1(l+2)\sqrt{(volV/2)}\right) \right\rceil,$$

l=⌈$_2$(volV/2)⌉, b is a positively integer governing the size of the output cluster, and $c_1$ and $c_3$ are constants with suggested values.

Algorithm 1 below illustrates a local graph cut algorithm designed to work on hypergraphs in one embodiment. The algorithm in one embodiment takes as input a hypergraph G, a seed basket v∈V, and upper bound φ on the conductance of a local cluster, and a positive integer b. A seed basket represents a given basket, for which a return probability is to be predicted. An upper bound φ on the conductance of a local cluster represents how different a local cluster is to the rest of the graph. A positive integer b controls the size of the output cluster. The output is a set of basket nodes within the identified local cluster. In Steps 1, the method computes $t_{last}$ and ε using Equation 9. The term "$t_{last}$" represent the number of iterations. Next, in Step 2, the method initializes $r_0$ to be an n×1 indicator vector where only the element corresponding to the seed node is set to one. The term "n"

represents the number of nodes on the graph. Steps 4 and 5 generate a sequence of vectors starting from $r_0$ based on the following rule $$q_t = \begin{cases} r_0, & \text{if } t = 0, \\ Mr_{t-1}, & \text{otherwise} \end{cases},$$

where $r_t=[q_t]_\varepsilon$, $t>0$. The term "$Mr_{t-1}$" represents the probability distribution of random walk particles on nodes. That is, at each time step, the method lets the random walk proceed by one step from the current distribution and then roundoff every $q_t(u)$ that is less than $\pi(u)\varepsilon$ to 0. $\pi(u)\varepsilon$ represents stationary distribution of the random walk. In one aspect, $q_t$ and $r_t$ are not necessarily probability vectors, as their components may sum up to less than 1. Then Step 7 finds the set $S_j(q_t)$ including j nodes whose corresponding values $$\frac{q_t(u)}{\pi(u)}$$

are the largest. The term "$S_j(q_t)$" represents sorted nodes. Step 8 determines whether this set satisfies three conditions: C.1 in Step 9 guarantees that the output set has cut conductance at most $\phi$; C.2 in Step 10 ensures that it contains a good amount of volume (e.g., not too much and not too little); C.3 in Step 11 guarantees that the output basket nodes have a large probability mass, where $c_4$ is a constant with suggested value.

| | Algorithm 1 |
|---|---|
| Input: | Hypergraph G, seed node v, conductance upper bound $\phi$, positive integer b |
| Output: | A local cluster $S_v$ near the seed node v. |
| 1: | Compute $t_{last}$ and $\varepsilon$ using Equation (9). |
| 2: | Initialize $r_0$ to be an n×1 all zero vector except for the element that corresponds to v, which is set to 1. |
| 3: | for t = 1:$t_{last}$ do |
| 4: | Set $q_t = Mr_{t-1}$ |
| 5: | Set $r_t = [q_t]_\varepsilon$. |
| 6: | for j = 1:n do |
| 7: | Let $S_j(q_t)$ denote the set of j nodes whose corresponding elements in $q_t/\pi$ are the largest. |
| 8: | Return $S_j(q_t)$ as $S_v$ if the following conditions are satisfied. |
| 9: | - C.1: $\Phi(S_j(q_t)) \leq \phi$. |
| 10: | - C.2: $2^b \leq \lambda_j(q_t) < \frac{5}{6} \text{vol } V$. |
| 11: | - C.3 $I_x(q_t, 2^b) \geq \frac{1}{c_4}(l+2)2^b$. |
| 12: | end for |
| 13: | end for |
| 14: | Return an empty set. |

The following lemma shows the time complexity of Algorithm 1, which is largely controlled by the size of the output cluster $2^b$. It also depends on vol V in a polylogarithmic way.

Lemma 1 [Time Complexity] Algorithm 1 runs in time $O(2^b \log^6(\text{vol } V)/\phi^4)$.

Proof. The monotonicity of multiplication may be proven by M defined in Equation 3, as well as the upper bound on the escaping mass of a t-step random walk with the volume of a node subset defined above. Therefore, following the same line of reasoning, it can be proven that the time complexity of Algorithm 1 is $O(2^b \log^6(\text{vol } V)/\phi^4)$.

In hypergraphs, the volume of the hypergraph is not in proportion to the number of hyperedges, as different hyperedges may be incident with different number of nodes. From Lemma 1, it can be seen that due to the linear dependence of the time complexity on the size of the output cluster, as well as the polylogarithmic dependence on the volume of the hypergraph, Algorithm 1 is suitable for large graphs, which is usually the case in E-tail product return prediction.

A truncated random-walk based graph partition algorithm of the present disclosure in one aspect may work particularly well for hypergraphs. The algorithm can efficiently and effectively find similar historical baskets for any given basket. The running time is linearly dependent on the size of the output cluster and polylogarithmically dependent on the volume of the hypergraph which is suitable for processing large-scale data sets. For instance, the running time may increase linearly with 2^b which controls the size of the output cluster and polylogarithmically with the volume of the graph which is even slower than linear. Therefore, when the graph is large, or increase is significant, the running time increases linearly or slower that linearly.

Dual-Level Return Prediction

Based on the output of Algorithm 1, a dual-level return prediction procedure may be provided, for instance, to provide the E-tailers with detailed information regarding the reason for a potential return. In one embodiment, the system and/or method may first predict if a basket contains products that are likely to be returned (basket-level prediction); then given such a basket, the system and/or method may predict which product(s) are candidates for return (product-level prediction).

Basket-Level Prediction

Let BSK-dupe denote the type of baskets that contain multiple similar products such as multiple sweaters in the same style, shade or size; and BSK-uniq denote the type of baskets that only contain distinct products based on product hierarchies. Let R(v) denote the return status of a basket $v \in V$, such that R(v)=1 if basket v contains products that are to be returned, and R(v)=0 otherwise. Suppose the ratio of the return probability between basket type BSK-dupe and type BSK-uniq is $\kappa$, i.e., $$\kappa = \frac{Pr\{R(v) = 1 \mid v \in BSK - dupe\}}{Pr\{R(v) = 1 \mid v \in BSK - uniq\}}, \quad (10)$$

where $Pr\{\cdot|\cdot\}$ denotes the return probability corresponding to a specific basket type and can be estimated from historical data.

Given a basket $v \in V$, the algorithm (Algorithm 1) returns a cluster of baskets $S_v \subset V$ that are similar to the given basket v. Among all the baskets in the cluster, it is assumed that the return probability ratio of baskets in BSK-dupe and BSK-uniq is preserved, i.e., $$\frac{Pr\{R(u) = 1 \mid u \in S_v, u \in BSK - dupe\}}{Pr\{R(u) = 1 \mid u \in S_v, u \in BSK - uniq\}} = \kappa. \quad (11)$$

Assume the return status of baskets in BSK-dupe and BSK-uniq follows two Bernoulli processes $B(\rho_1)$ and $B(\rho_2)$, where $\rho_1$ and $\rho_2$ are the success probabilities of the two processes respectively. Suppose that there are N baskets in the returned cluster $S_v$, i.e., $|S_v|=N$; $N_1$ and $N_2$ baskets without returns from BSK-dupe and BSK-uniq, respectively. The following lemma shows how to estimate the two parameters $\rho_1$ and $\rho_2$ via maximum likelihood estimation.

Lemma 2 Given two Bernoulli processes $B(\rho_1)$ and $B(\rho_2)$, assume that the ratio of the success probabilities is a constant, i.e., $\rho_1/\rho_2=\kappa$. Among a total of N trials from the two Bernoulli processes, $N_1$ failures are observed from $B(\rho_1)$ and $N_2$ failures are observed from $B(\rho_2)$. The maximum likelihood estimate of the two parameters are $$\hat{\rho}_1 = \frac{1}{2}\left[f_1 + f_2\kappa - \sqrt{f_1^2 + f_1^2\kappa^2 + 2\kappa(2 - 2f_1 - 2f_2 + f_1f_2)}\right], \quad (12)$$

and $$\hat{\rho}_2 = \hat{\rho}_1/\kappa. \text{ where } f_1 = 1 - \frac{N_1}{N} \text{ and } f_2 = 1 - \frac{N_2}{N}. \quad (13)$$

Proof. Let $N_0$ denote the number of Bernoulli trials from $B(\rho_1)$. Given a total of N trails from the two Bernoulli processes, there are $N-N_0$ trials from the Bernoulli process $B(\rho_2)$. The likelihood function is given by $$L=(1-\rho_1)^{N_1}\rho_1^{N_0-N_1}(1-\rho_2)^{N_2}\rho_2^{N-N_0-N_2}.$$

As $\rho_1=\rho_2\kappa$, there is $$L=(1-\kappa\rho_2)^{N_1}(\kappa\rho_2)^{N_0-N_1}(1-\rho_2)^{N_2}\rho_2^{N-N_0-N_2}.$$

Taking the logarithm of above likelihood function, the system and/method obtain $$l=N_1\log(1-\kappa\rho_2)+(N_0-N_1)\log(\kappa\rho_2)+N_2\log(1-\rho_2)+ (N-N_0-N_2)\log\rho_2$$

Let $\partial l/\partial\rho_2=0$, the system and/or method obtain the maximum likelihood estimate of $\rho_1$ in Equation (12) and $\rho_2$ in Equation (13).

According to Lemma 2, the estimated return probability of the given basket v is $$\hat{Pr}\{R(v) = 1\} = \begin{cases} \hat{\rho}_1 & \text{if } v \in BSK - dupe; \\ \hat{\rho}_2 & \text{if } v \in BSK - uniq \end{cases}. \quad (14)$$

Product-Level Prediction

For baskets that are predicted to be returned, a method to predict which specific products are likely to be returned is provided. Let $R_g(g)$ denote the return status of a given product g, i.e., $R_g(g)=1$ if returned, and $R_g(g)=0$ otherwise. For a given product $g \in v$ and $v \in V$, let $S_v \subset V$ be the local cluster obtained based on the given basket v using Algorithm 1. The return probability of the product g is estimated by the fraction of baskets with product g returned out of all the baskets that are returned and contain the product g (for these baskets, the returned product may not be g), i.e., $$\hat{Pr}\{R_g(g) = 1 \mid R(v)) = 1\} = \frac{\sum_{u \in S_v} 1_{R_g(g)=1, g \in u}}{\sum_{u \in S_v} 1_{R(u)=1, g \in u}}, \quad (15)$$

where $1_X$ is an indicator function, which is equal to 1 if condition X is true, and 0 otherwise.

Based on the steps defined in the above, the marginal return probability of a product in a given basket $g \in v$ can be calculated as follows.

$$\hat{Pr}\{R_g(g)=1\}=\hat{Pr}\{R_g(g)=1 \mid R(v)=1\}\hat{Pr}\{R(v)=1\}. \quad (16)$$

In the above equation, $R(v)=1$ is omitted from the left hand side, as $R_g(g)=1$ indicates $R(v)=1$, i.e., the return status of a basket is 1 if one of its products has been returned.

By first predicting returns at the basket-level and then at the product-level, the dual-level procedure can leverage the basket-level information, including but not limited to product interactions, into the prediction of each product in the baskets. As a result, despite that no detailed information of product attributes are included in the model, the system and/or method can predict the return intention at the product-level. Other benefits may include Improved user experience. For instance, the system and/or method may displays products that customers are more likely to purchase unlike products that customers end up returning. This increases customer's interests to shopping and keeping the product, and saves their time on returning unexpected products, as well as reduced cost of handling returns by the providers.

Figure 2:
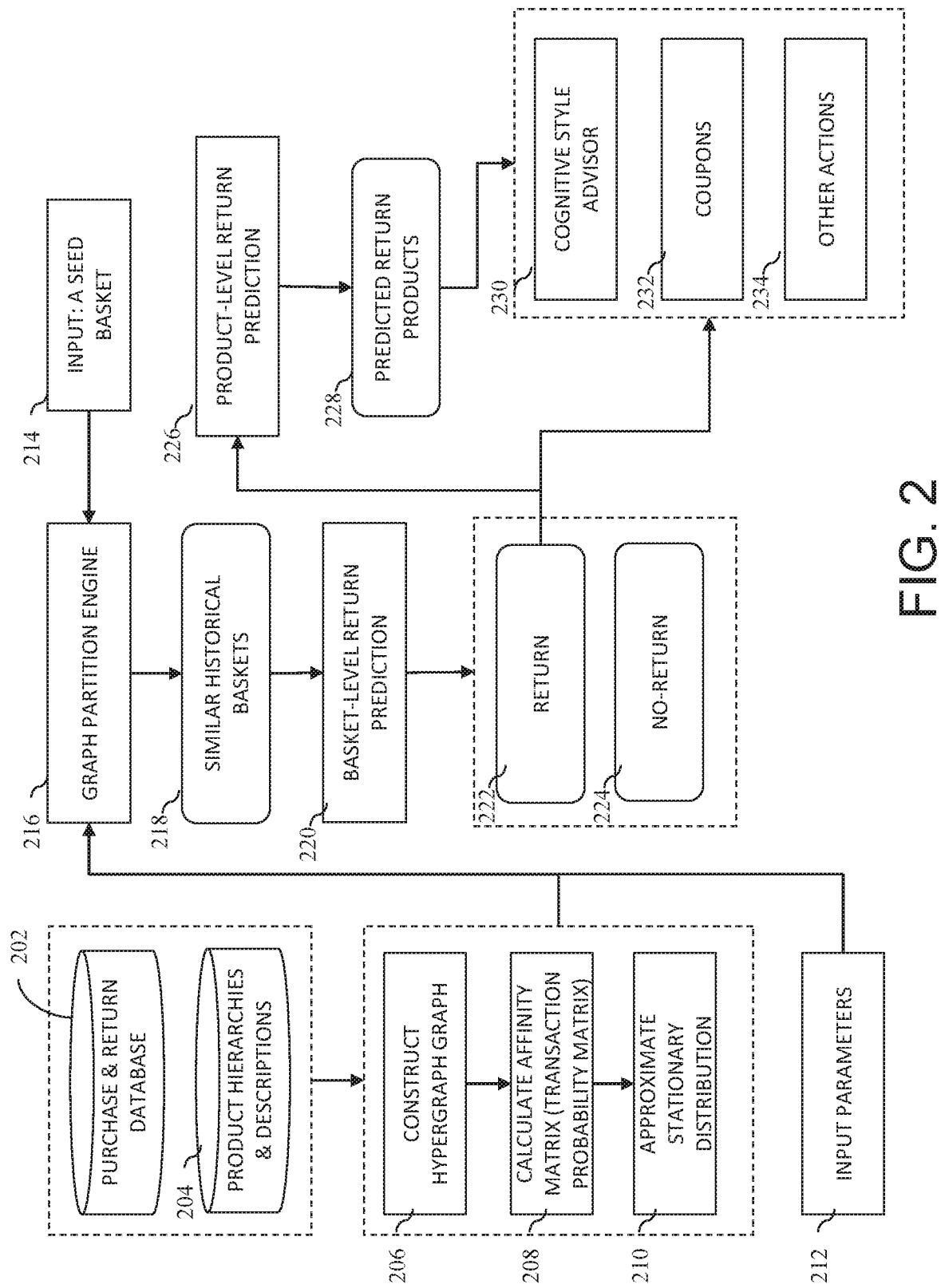
FIG. 2 is a flow diagram illustrating a method in one embodiment.

FIG. 2 is a diagram illustrating a method in one embodiment. Purchase and return database 202 stores data associated with past or history of purchases and returns. Product hierarchies and descriptions database 204 stores data associated with products. Based on the data from the purchase and return database 202 and the data from the product hierarchies and descriptions database 204, a hypergraph is generated at 206. An example of a hypergraph is shown in FIG. 1A and FIG. 1B. At 208, a transaction probability matrix as shown in Equation (3) is computed.

At 210, approximate stationary distribution is determined, for instance, as in Equation (4).

At 216, a graph partition engine, e.g., a computer executable component such as software or programmed hardware, executes a truncated-random walk based graph partition method, e.g., as shown in Algorithm 1, given input parameters 212, the hypergraph generated at 206, and a seed basket 214. Input parameters 212 include conductance upper bound ϕ, positive integer b.

At 218, the graph partition engine outputs similar historical baskets similar to the seed basket 214.

At 220, basket-level return prediction is made employing the data associated with the similar historical baskets within the returned cluster 218. For instance, basket-level return prediction calculates the ratio of the return probability between two basket types as shown in Equation (10) above. In one embodiment, it may be assumed that all the baskets in the clusters obtained from the graph partition method preserve the above return probability ratio, for instance, as shown in Equation (11). In one embodiment, basket-level return prediction models the return status of the two types of baskets as two Bernoulli processes and estimate the Bernoulli process parameters using MLE, as shown in Equation (12) and Equation (13). The basket-level return prediction at 220 predicts whether the basket will be returned 222 or not returned 224.

Responsive to determining that the basket will be returned, product-level return prediction is made at 226. For instance, given product g in the obtained local cluster $s_v$ for the given basket v using the graph partition method, the return probability of the product g is estimated by the fraction of baskets with product g returned out of all the baskets that are returned and contain the product g, for example, as shown in Equation (15). A marginal return probability of a product in a given basket is calculated as the product of the basket return probability and product return probability given the basket is returned, for instance, as shown in Equation (16). The product-level return prediction at 226 outputs predicted return products 228.

Based on a prediction that one or more items in a shopping cart will be returned, for example, based on determination at 220 and 226, one or more ameliorative actions may be provided. An example of an action may be invoking cognitive style advising 230 such as a chatbot to engage with a customer online, for example, in real-time, as the customer is working on the shopping cart. For instance, a system and/or method, for instance, via a cognitive analysis may determine that items 1 and 3 are in the same shade but different sizes, and items 1 and 2 are in the same size but different shades. The system and/or method can infer that the customer is not sure about the size and shade. The system and/or method may invoke a chat bot, for example, initiate poppin-up a chat bot on a user's device to interact with the customer and advise on size and shade.

Another example of an ameliorative action may include providing or offering discounts or coupons 232 or the like to prevent future returns. For instance, the system and/or method may predict that a shopping cart will be returned, and particularly item 3 will be returned. Based on the prediction, the system and/or method may generate an offer for this customer/user to consider.

Yet, another example of an ameliorative action 234 may be a return affinity aware search result. For instance, return affinity with a type or category of item may be determined, associated with a user, e.g., based on prediction that one or more items in a shopping cart will be returned. For instance, a method in one embodiment may link the product return prediction to customers and generate a list of products that each customer is likely to return, for instance, when a customer is browsing or searching products online. A recommendation engine can take this information into account. For instance, the recommendation engine may omit showing or showing in a lower rank the related products if the related products are on the list of the products that the customer is likely to return.

Responsive to the user performing a search, a search engine that provides search results to the user may select items which meet a return affinity threshold. For instance, based on a threshold on return affinity scores, items with return affinity which are above the threshold may be adjusted in the search results. As an example, if a user is determined to have return affinity greater than a threshold value, with respect to a specific type or category of item, items of that type or category may be omitted or ranked low in the search result.

Figure 3:
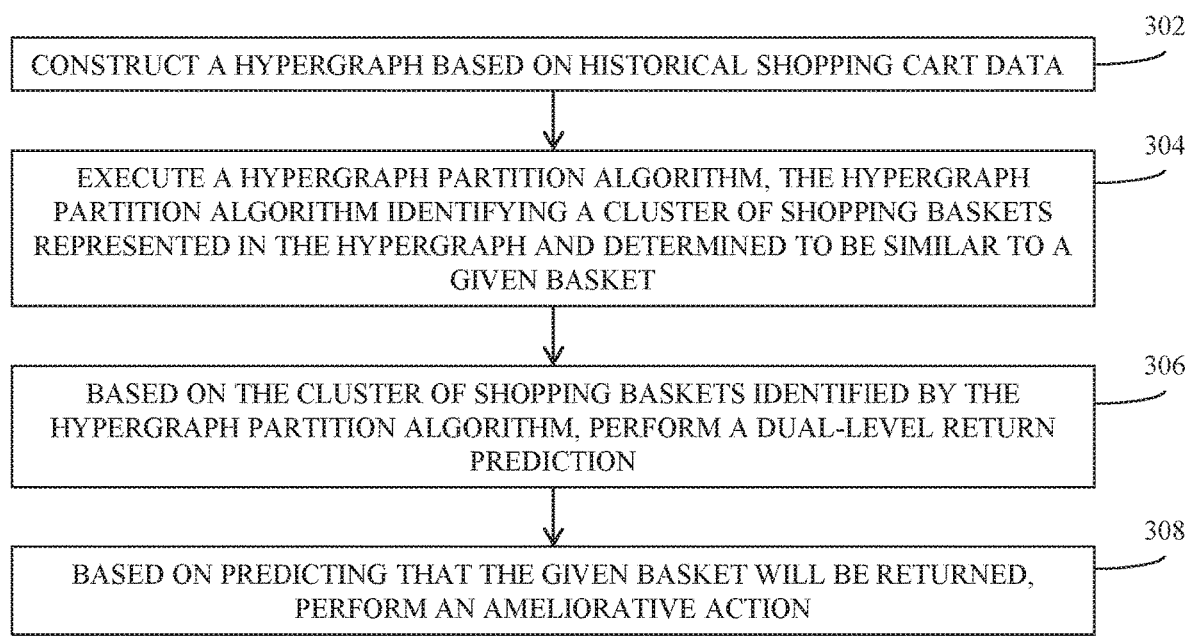
FIG. 3 is a flow diagram illustrating a method in one embodiment.

FIG. 3 is a flow diagram illustrating a method in one embodiment. At 302, a hypergraph is constructed based on historical shopping cart data. A node of the hypergraph corresponds to a shopping basket, and a hyperedge of the hypergraph corresponds to a unique product, the hyperedge connecting all nodes of the hypergraph representing baskets containing the unique product. The hypergraph represents historical purchase and return records.

At 304, a hypergraph partition algorithm is executed. The hypergraph partition algorithm identifies a cluster of shopping baskets represented in the hypergraph, which are determined to be similar to a given basket. An example algorithm is shown in Algorithm 1 above.

At 306, based on the cluster of shopping baskets identified by the hypergraph partition algorithm, a dual-level return prediction is performed. The dual-level return prediction includes predicting whether the given basket will be returned, and based on predicting that the given basket will be returned, predicting a probability that a product in the given basket will be returned.

At 308, based on predicting that the given basket will be returned, an ameliorative action is performed to reduce the probability that a product in the given basket will be returned.

Time Complexity

Figure 4:
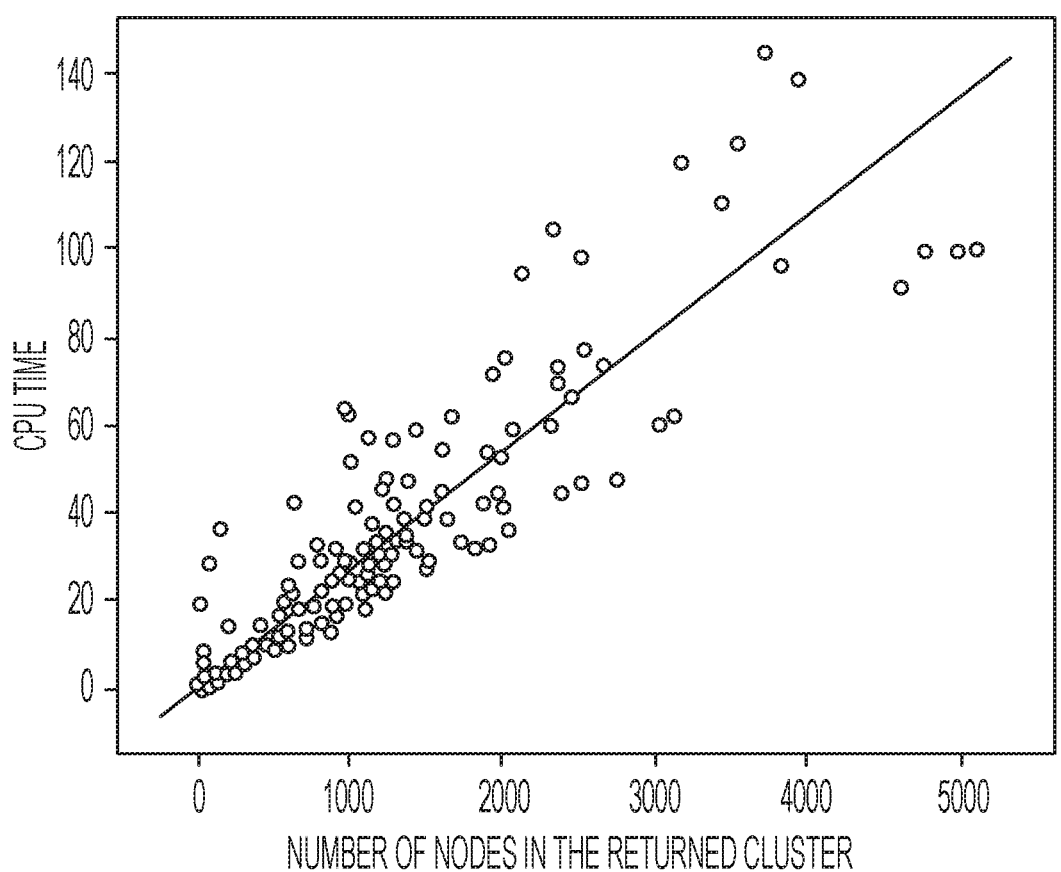
FIG. 4 shows time complexity experiments in one embodiment.

In one aspect, the computational complexity of Algorithm 1 is evaluated empirically by recording the central processing unit (CPU) time (seconds) and the number of nodes in the output clusters in experiments to evaluate the basket-level prediction performance. The experiments have been performed on a distributed computing environment with 12 Intel Xeon® CPU processors (2.30 GHz, 8 cores each processor) and a total of 512 GB of RAM, equipped with Red Hat Enterprise Linux 7 operating system. Intel Corporation is a corporation headquartered in Santa Clara, Calif. Red Hat is a corporation having headquarters in Raleigh, N.C. The code has been executed using 64-bit Python 3.6. FIG. 4 shows time complexity experiments in one embodiment. The CPU time scales linearly with respect to the number of nodes in the returned cluster. This demonstrates that Algorithm 1 is efficient for large scale applications. For instance, the CPU time may only increase linearly or slower than linearly with the number of nodes in a graph. Thus, improvement in running time of a CPU or another computer processor may be provided.

Figure 5:
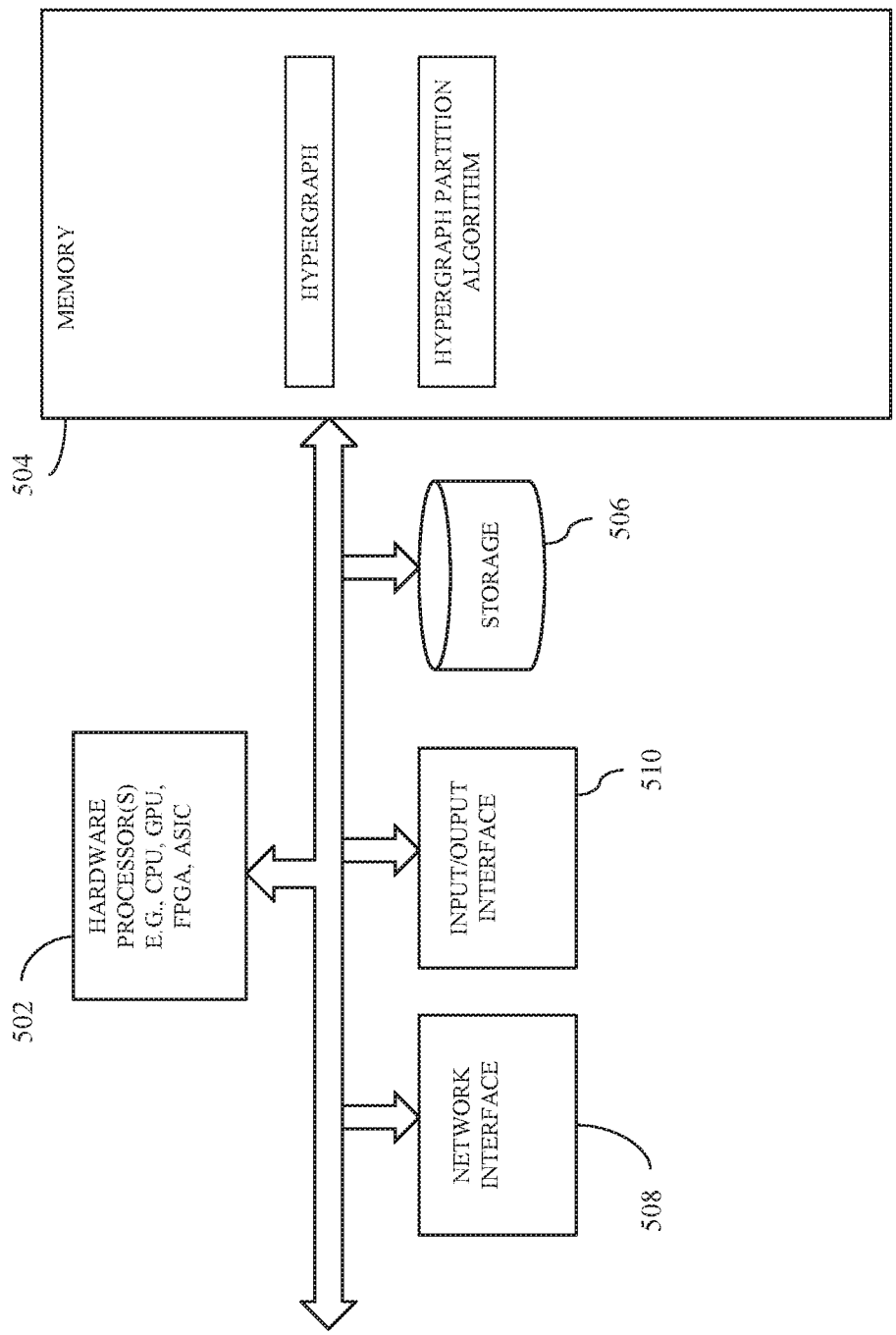
FIG. 5 is a diagram showing components of a system in one embodiment that predicts product return before a purchase is made via hypergraph-based local graph cut.

FIG. 5 is a diagram showing components of a system in one embodiment that predicts product return before a purchase is made via hypergraph-based local graph cut. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate a hypergraph, execute a hypergraph partition algorithm, and perform a dual-level prediction. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 504 may, for example, store instructions and/or data for functioning of the one or more hardware processors 502, and may include an operating system and other program of instructions and/or data. One more hardware processors 502 may receive input comprising chat space conversation data. In one aspect, a generated hypergraph may be stored in a storage device 506 or received via a network interface 508 from a remote device, and may be temporarily loaded into the memory device 504 for finding similar shopping baskets. In one aspect, input data such as historical shopping cart data may be stored in a storage device 506 or received via a network interface 508 from a remote device, and may be temporarily loaded into the memory device 504 for building the hypergraph. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
constructing a hypergraph data structure in computer memory based on historical shopping cart data, a node of the hypergraph data structure corresponding to a shopping basket, and a hyperedge of the hypergraph data structure corresponding to a unique product, the hyperedge connecting all nodes of the hypergraph data structure representing baskets containing the unique product, the hypergraph data structure representing historical purchase and return records;
executing a hypergraph partition algorithm, the hypergraph partition algorithm identifying a cluster of shopping baskets represented in the hypergraph data structure and determined to be similar to a given basket, the given basket being an online shopping basket;
based on the cluster of shopping baskets identified by the hypergraph partition algorithm, performing a dual-level return prediction, the dual-level return prediction comprising predicting whether the given basket will be returned, and based on predicting that the given basket will be returned, predicting a probability that a product in the given basket will be returned; and based on predicting that the given basket will be returned, performing an ameliorative action to reduce the probability, the ameliorative action including at least initiating a chatbot to interact with a user in real time, the chatbot interacting with the user and providing guidance regarding the product placed in the online shopping basket.

2. The method of claim 1, wherein the dual-level return prediction is performed before a purchase associated with the given basket is made.

3. The method of claim 1, wherein the ameliorative action comprises providing a discount coupon on the product.

4. The method of claim 1, wherein the ameliorative action comprises providing a return affinity aware search result responsive to a user associated with the given basket performing a product search.

5. The method of claim 1, wherein the hypergraph partition algorithm comprises a local graph cut algorithm using truncated random walk on the hypergraph data structure, the truncated random walk starting from an input seed node and exploring a neighborhood of the seed node on the hypergraph data structure.

6. The method of claim 1, wherein the guidance regarding the product includes guidance with respect to at least one of the product's style, the product's shade, the product's size and the product's fit.

7. A computer readable storage medium storing a program of instructions executable by a machine to perform a method comprising:

constructing a hypergraph data structure in computer memory based on historical shopping cart data, a node of the hypergraph data structure corresponding to a shopping basket, and a hyperedge of the hypergraph data structure corresponding to a unique product, the hyperedge connecting all nodes of the hypergraph data structure representing baskets containing the unique product, the hypergraph data structure representing historical purchase and return records;

executing a hypergraph partition algorithm, the hypergraph partition algorithm identifying a cluster of shopping baskets represented in the hypergraph data structure and determined to be similar to a given basket, the given basket being an online shopping basket;

based on the cluster of shopping baskets identified by the hypergraph partition algorithm, performing a dual-level return prediction, the dual-level return prediction comprising predicting whether the given basket will be returned, and based on predicting that the given basket will be returned, predicting a probability that a product in the given basket will be returned; and based on predicting that the given basket will be returned, performing an ameliorative action to reduce the probability, the ameliorative action including at least initiating a chatbot to interact with a user in real time, the chatbot interacting with the user and providing guidance regarding the product placed in the online shopping basket.

8. The computer readable storage medium of claim 7, wherein the dual-level return prediction is performed before a purchase associated with the given basket is made.

9. The computer readable storage medium of claim 7, wherein the ameliorative action comprises providing a discount coupon on the product.

10. The computer readable storage medium of claim 7, wherein the ameliorative action comprises providing a return affinity aware search result responsive to a user associated with the given basket performing a product search.

11. The computer readable storage medium of claim 7, wherein the hypergraph partition algorithm comprises a local graph cut algorithm using truncated random walk on the hypergraph data structure, the truncated random walk starting from an input seed node and exploring a neighborhood of the seed node on the hypergraph data structure.

12. A system comprising:

at least one hardware processor;

a memory device coupled with the at least one hardware processor, the at least one hardware processor operable to:

construct a hypergraph data structure in the memory device based on historical shopping cart data, a node of the hypergraph data structure corresponding to a shopping basket, and a hyperedge of the hypergraph data structure corresponding to a unique product, the hyperedge connecting all nodes of the hypergraph data structure representing baskets containing the unique product, the hypergraph data structure representing historical purchase and return records;

execute a hypergraph partition algorithm, the hypergraph partition algorithm identifying a cluster of shopping baskets represented in the hypergraph data structure and determined to be similar to a given basket, the given basket being an online shopping basket;

based on the cluster of shopping baskets identified by the hypergraph partition algorithm, perform a dual-level return prediction, the dual-level return prediction comprising predicting whether the given basket will be returned, and based on predicting that the given basket will be returned, predicting a probability that a product in the given basket will be returned; and based on predicting that the given basket will be returned, perform an ameliorative action to reduce the probability, the ameliorative action including at least initiating a chatbot to interact with a user in real time, the chatbot interacting with the user and providing guidance regarding the product placed in the online shopping basket.

13. The system of claim 12, wherein the dual-level return prediction is performed before a purchase associated with the given basket is made.

14. The system of claim 12, wherein the ameliorative action comprises providing a discount coupon on the product.

15. The system of claim 12, wherein the ameliorative action comprises providing a return affinity aware search result responsive to a user associated with the given basket performing a product search.

16. The system of claim 12, wherein the hypergraph partition algorithm comprises a local graph cut algorithm using truncated random walk on the hypergraph data structure, the truncated random walk starting from an input seed node and exploring a neighborhood of the seed node on the hypergraph data structure.

* * * * *